US012795262B2

(12) United States Patent
Takayanagi et al.

(10) Patent No.: US 12,795,262 B2
(45) Date of Patent: Nov. 10, 2026

(54) SOLID-STATE IMAGING DEVICE, METHOD FOR MANUFACTURING SOLID-STATE IMAGING DEVICE, AND ELECTRONIC APPARATUS

(71) Applicant: Brillnics Singapore Pte. Ltd., Singapore (SG)

(72) Inventors: Isao Takayanagi, Tokyo (JP); Rimon Ikeno, Tokyo (JP); Toshihiko Isozaki, Tokyo (JP); Masato Nagamatsu, Tokyo (JP); Kazuya Mori, Tokyo (JP); Hirofumi Abe, Tokyo (JP); Masayuki Uno, Tokyo (JP)

(73) Assignee: Brillnics Singapore Pte. Ltd., Singapore (SG)

( * ) Notice: Subject to any disclaimer, the term of this patent is extended or adjusted under 35 U.S.C. 154(b) by 225 days.

(21) Appl. No.: 18/673,171

(22) Filed: May 23, 2024

(65) Prior Publication Data

US 2024/0397233 A1 Nov. 28, 2024

(30) Foreign Application Priority Data

May 23, 2023 (JP) ................................. 2023-084857
May 15, 2024 (JP) ................................. 2024-079598

(51) Int. Cl.

| | |
|---|---|
| ***H04N 25/79*** | (2023.01) |
| ***H04N 25/772*** | (2023.01) |
| ***H04N 25/78*** | (2023.01) |

(52) U.S. Cl.
CPC ........... *H04N 25/772* (2023.01); *H04N 25/78* (2023.01)

(58) Field of Classification Search
None
See application file for complete search history.

(56) References Cited

U.S. PATENT DOCUMENTS

2008/0266434 A1 10/2008 Sugawa et al.
2014/0146210 A1* 5/2014 Lee ........................ H04N 25/63 348/302
2016/0165159 A1* 6/2016 Hseih .................... H10F 39/813 348/273
2018/0227518 A1* 8/2018 Ganguly .............. H04N 25/585
2020/0204750 A1* 6/2020 Cremers ................ H04N 25/42
2020/0236318 A1 7/2020 Okura

FOREIGN PATENT DOCUMENTS

JP 2005-328493 A 11/2005
JP 2020-115603 A 7/2020

* cited by examiner

*Primary Examiner* — Twyler L Haskins
(74) *Attorney, Agent, or Firm* — Pillsbury Winthrop Shaw Pittman LLP

(57) ABSTRACT

A pixel is formed by a photoelectric conversion film that converts light into a photogenerated current and a semiconductor pixel circuit. The photoelectric conversion film and the semiconductor pixel circuit are stacked and electrically coupled within the pixel. The photoelectric conversion film has an infrared NIR sensitivity. The semiconductor pixel circuit includes a pixel analog circuit that detects the photoelectric conversion current, a sample-and-hold circuit, an ADC, in-pixel logic, digital memory and the like.

10 Claims, 10 Drawing Sheets

SOLID-STATE IMAGING DEVICE, METHOD FOR MANUFACTURING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2023-084857 (filed on May 23, 2023) and Japanese Patent Application Serial No. 2024-079598 (filed on May 15, 2024) the contents of which are hereby incorporated by reference in its entirety.

TECHNICAL FIELD

The present disclosure relates to a solid-state imaging device, a method for manufacturing a solid-state imaging device, and an electronic apparatus.

BACKGROUND

Solid-state imaging devices (image sensors) including photoelectric conversion elements for detecting light and generating charges are embodied as complementary metal oxide semiconductor (CMOS) image sensors, which have been in practical use. The CMOS image sensors have been widely applied in various types of electronic apparatuses such as digital cameras, video cameras, surveillance cameras, medical endoscopes, personal computers (PCs), mobile phones and other portable terminals (mobile devices) as their parts.

The CMOS image sensors include, for each pixel, a photodiode (a photoelectric conversion element) and a floating diffusion (FD) amplifier having a floating diffusion (FD). The mainstream design of the read-out operation in the CMOS image sensors is a column parallel output processing performed by selecting a row in a pixel array and reading the pixel signals simultaneously in the column direction.

The solid-state imaging devices (CMOS image sensors) can be constituted by, for example, basic 4-transistor (4Tr) pixels. The 4Tr pixels each include, for one photodiode (photoelectric conversion element), one transfer transistor serving as a transfer element, one reset transistor serving as a reset element, one source follower transistor serving as a source follower element and one select transistor serving as a select element.

The transfer transistor is kept in the non-conduction state during a charge integration period of a photodiode. During a transfer period when integrated charge of the photodiode is transferred to the floating diffusion FD, a drive signal is applied to the gate of the transfer transistor so that the transfer transistor is kept in the conduction state to transfer the charge photoelectrically converted by the photodiode to the floating diffusion FD.

The reset transistor resets the potential of the floating diffusion FD to the power line voltage when a reset signal is supplied to the gate.

The gate of the source follower transistor is connected to the floating diffusion FD. The source follower transistor is connected to a vertical signal line via the select transistor and forms a source follower together with a constant current source as a load circuit outside the pixel part. A control signal (address signal or select signal) is given to the gate of the select transistor to turn on the select transistor. Once the select transistor is turned on, the source follower transistor amplifies the potential of the floating diffusion FD and outputs the voltage corresponding to that potential to the vertical signal line. Through the vertical signal line, the voltage outputted from each pixel is supplied to a column parallel processing part, which serves as a pixel signal reading circuit. In the column parallel processing, image data is converted from analog signals to digital signals, for example, and transferred to the signal processing part in the subsequent stage, where it undergoes image signal processing to obtain a desired image.

As described above, the CMOS image sensors generate electrons from a slight amount of light through photoelectric conversion, converts the electrons into voltage with a small capacitor, and outputs the voltage using the source follower transistor having a small area. Therefore, small noise such as the noise generated when the capacitor is reset and variations among each transistor need to be eliminated. To do so, the signal difference between the reset level and the luminance level (signal level) is output for each pixel. As mentioned above, the CMOS image sensor outputs the signal difference between the reset level and the luminance level for each pixel in order to eliminate the reset noise and the threshold variations. In this way, the CMOS image sensor can detect a signal of several electrons. This operation of detecting the signal difference is called correlated double sampling (CDS) and is widely used. CDS readout is sequentially performed on all pixels arranged in an array, and normal image data for one frame is outputted.

For example, in a read-out scan period, the floating diffusion FD is reset to the power supply voltage (the reference voltage) in a reset period, the charges in the floating diffusion FD are then converted into a voltage signal with a conversion gain corresponding to the FD capacitance, and the voltage signal is output to the vertical signal line as a read-out reset signal Vrst of the reference level (a signal of the reference level). Subsequently, in a transfer period, the charges (electrons) produced by the photoelectric conversion and then stored in the photodiode are transferred to the floating diffusion FD. The charges of the floating diffusion FD are converted into a voltage signal with a conversion gain corresponding to the FD capacitance, and the voltage signal is output to the vertical signal line as a read-out signal Vsig of the signal level (a signal of the signal level). The output signals from the pixel are subjected to the CDS (correlated double sampling) process in the form of a differential signal (Vsig−Vrst) in a column reading circuit.

As described above, an ordinary pixel read-out signal (hereinafter also referred to as "pixel signal") PS includes one read-out reset signal Vrst of the reference level and one read-out signal Vsig of the signal level.

To improve characteristics, various methods have been proposed for solid-state imaging devices (CMOS image sensors) that have a high dynamic range (HDR) and provides a high image quality.

As one of the approaches applied to increase the dynamic range, a lateral overflow integration capacitor (LOFIC) can be proposed (see, for example, Japanese Patent Application Publication No. 2005-328493). When having the LOFIC configuration, the pixels have a storage capacitor and a storage transistor in addition to the above-listed basic 4-transistor (4Tr) constituents, so that overflow charges overflowing from the photodiode within the same exposure period are not swept out but stored in the storage capacitor.

The LOFIC pixel can have two types of conversion gains: the conversion gain determined by the capacitance Cfd1 of the floating diffusion (high gain: proportional to 1/Cfd1); and the conversion gain determined by the sum of the capacitance Cfd1 of the floating diffusion and the LOFIC capacitance Clofic of the storage capacitor C2 (low gain: proportional to 1/(Cfd1+Clofic)). In other words, the LOFIC pixels can achieve high full well capacity and low dark noise using low conversion gain (LCG) signals and high conversion gain (HCG) signals.

The LOFIC architecture, however, has serious issues, or faces a reduced SNR at the conjunction (combination) point of a high conversion gain (HCG) signal and a low conversion gain (LCG) signal. More specifically, the LOFIC architecture alone can not remove kTC noise of the LCG signal, which results in a lower SNR at the conjunction point between the HCG signal and the LCG signal.

For example, although not intended for the LOFIC architecture, Japanese Patent Application Publication No. 2020-115603 ("the '603 Publication") proposes a specific circuit configuration of a pixel signal processing part in a reading circuit of a solid-state imaging device that is capable of removing noise gap at the conjunction point between low-conversion-gain signal and high-conversion-gain signal, preventing an increase in power consumption and circuit area and additionally achieving a high dynamic range.

The CMOS image sensor having the LOFIC architecture requires a dual reading circuit since the high-conversion-gain (HCG) signal and the low-conversion-gain (LGC) signal have opposite signal directions, more specifically, opposite level-transitioning directions. The pixel signal processing unit in the reading circuit disclosed in the '603 Publication, however, is capable of reading both the HCG signal and LCG signal generated by the single-exposure HDR (SEHDR) pixel having the same signal direction and thus can not be applied to CMOS image sensors having the LOFIC architecture.

In addition, to realize a dual reading circuit compatible with CMOS image sensors with LOFIC structure, a reading circuit that can process both LCG and HCG signals with minimal circuit overhead and low power consumption is desired to reduce the chip cost.

By using the solid-state imaging device (image sensor) described above, typically, owners of various electronic devices or users authorized to use the device can easily play back captured image data and view the images.

SWIR (Short Wavelength Infrared 1-1.7 μm-2.5 μm wavelengths) imaging technology has been put into practical use with many applications. Applications of this kind include, for example, automotive and atmospheric surveillance, eye-safe active IR imaging at second-order intensity above 940 nm, in-car monitoring, night vision, textured 3D, FA, physical testing, and image inspection through surveillance cameras such as smart phones, displays, and more.

One of the technical challenges of SWIR image sensors is cancellation of offsets due to large thermal dark currents (offset signals) at room and high temperatures. In order to respond to photons having lower energy than that of visible light photons (wavelengths from 500 to 650 nm), SWIR photoelectron conversion materials (Ge, InGaAs, quantum dots, etc.) have a lower energy band gap and thus materials with such a lower band gap tend to be affected by thermal dark current.

For large offset cancellation, large integration capacity is required inside pixel to accumulate both offset signal and effective signal. In some cases, offset signal becomes much larger than the photo signal.

Prior art techniques introduced methods such as increase charge capacitance in pixel, cooling the device, high-frame rate readout in advance to saturation by the dark signal.

<Issues to be Addressed>

There are a number of practical issues that need to be addressed and/or resolved in this technical field.

<Cooling the System>

While cooling the device is the most effective way to reduce offset, it is not preferred in consumer system such as smartphone or car in-cabin monitor because of additional power consumption, additional size, additional mechanics and time for temperature stabilization.

<Increase Charge Capacitance in Pixel>

In case of charge capacitor, the maximum voltage is limited by power supply voltage of the pixel readout integrated circuit (ROIC). Therefore, increase the capacitance is usually equivalent to reduction of gain. Lower gain usually results in lower circuit resolution and worse input-signal-referred noise.

Another issue is that SWIR photoconductive materials typically have a voltage-dependent responsivity that affects the accuracy of offset subtraction.

<High Frame Rate Readout in Advance to Saturation by the Dark Signal>

High-frame rate readout to prevent offset saturation is also effective way. Practical issue of this scheme is increase of signal readout bandwidth and signal processing workload in the external storage for summation of multiple frame signals in high frame rate. Overall, for the consumer SWIR image sensors, no cooling system, high pixel integration capacity without gain degradation, stable photosensitivity during signal integration, and less interface bandwidth are required.

SUMMARY

An object of the present disclosure is to provide a solid-state imaging device, a method of manufacturing a solid-state imaging device, and electronic equipment capable of obtaining high pixel integration capacity without gain degradation, stable photosensitivity during signal integration, and less interface bandwidth required, without the need for cooling.

To address these issues, digital pixel, charge transconductance integration amplifier (CTIA), and pixel-level oversampling techniques have been implemented in SWIR image sensors.

A solid-state imaging device according to one aspect of the disclosure includes a pixel part having a pixel arranged therein. The pixels each include a photoelectric conversion layer converting light into a photogenerated current and a semiconductor pixel circuit. The photoelectric conversion film and the semiconductor pixel circuit are stacked and electrically coupled to each other within the pixel. The photoelectric conversion film has an infrared sensitivity. The semiconductor pixel circuit includes a pixel analog circuit detecting the photogenerated current, and a pixel analog-to-digital (AD) conversion circuit converting an analog signal from the pixel analog circuit to a digital signal.

A second aspect of the disclosure provides a method for manufacturing a solid-state imaging device having a pixel part that includes pixels arranged therein. The method includes: forming the pixels by a photoelectric conversion film and a semiconductor pixel circuit; and stacking the photoelectric conversion film and the semiconductor pixel circuit together and electrically coupling the photoelectric conversion film and the semiconductor pixel circuit in each of the pixels. The photoelectric conversion film has an infrared sensitivity. The method further includes, forming, in the semiconductor pixel circuit, a pixel analog circuit that detects the photogenerated current, and a pixel analog-to-digital (AD) conversion circuit that converts an analog signal from the pixel analog circuit to a digital signal.

An electronic apparatus according to a third aspect of the disclosure includes: a solid-state imaging device; and an optical system for forming a subject image on the solid-state imaging device. The solid-state imaging device includes a pixel part having a plurality of pixels arranged therein. The pixels each include a photoelectric conversion layer converting light into a photogenerated current and a semiconductor pixel circuit. The photoelectric conversion film and the semiconductor pixel circuit are stacked and electrically coupled to each other within the pixel, The photoelectric conversion film has an infrared sensitivity. The semiconductor pixel circuit includes a pixel analog circuit detecting the photogenerated current, and a pixel analog-to-digital (AD) conversion circuit converting an analog signal from the pixel analog circuit to a digital signal.

Advantageous Effects

According to the aspects of the disclosure, it is possible is to obtain high pixel integration capacity without gain degradation, stable photosensitivity during signal integration, and less interface bandwidth required, without the need for cooling.

DESCRIPTION OF THE EMBODIMENTS

Embodiments of the present disclosure will be hereinafter described with reference to the drawings.

First Embodiment

Figure 1:
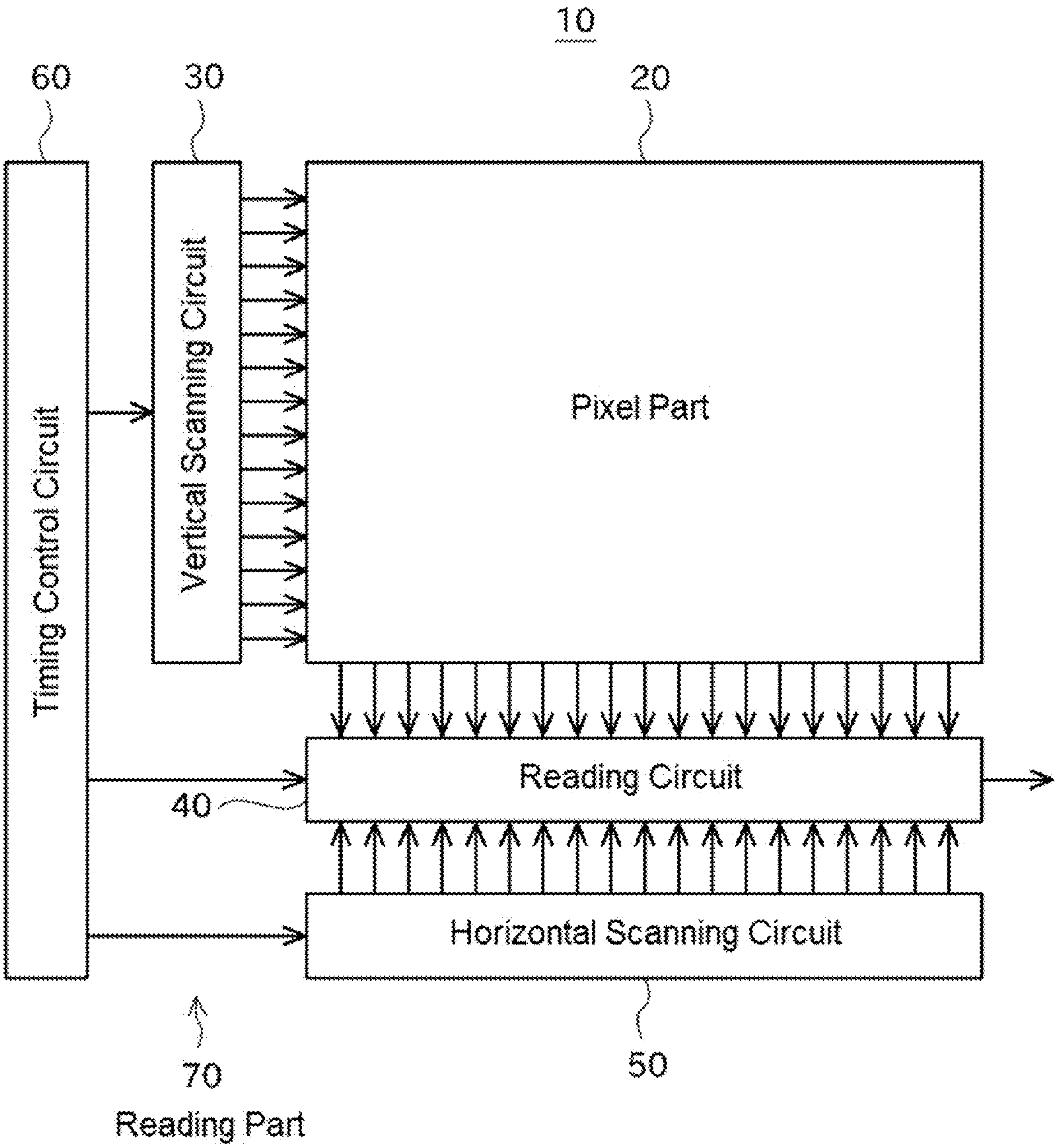
FIG. 1 is a block diagram showing an example configuration of a solid-state imaging device relating to a first embodiment of the present disclosure.
Figure 2:
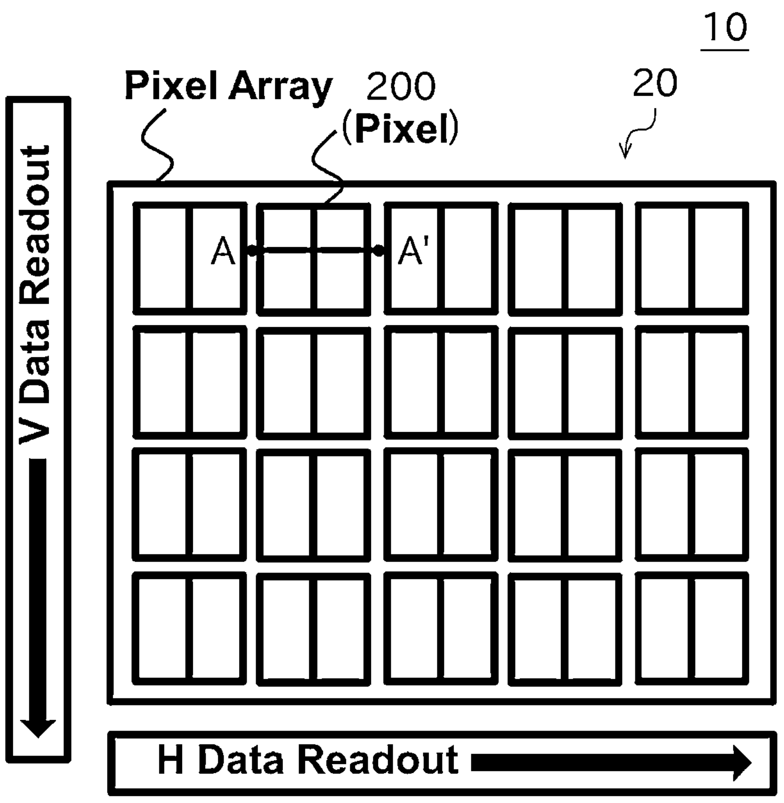
FIG. 2 shows an example configuration of a pixel of the solid-state imaging device relating to the first embodiment of the present disclosure.
Figure 3:
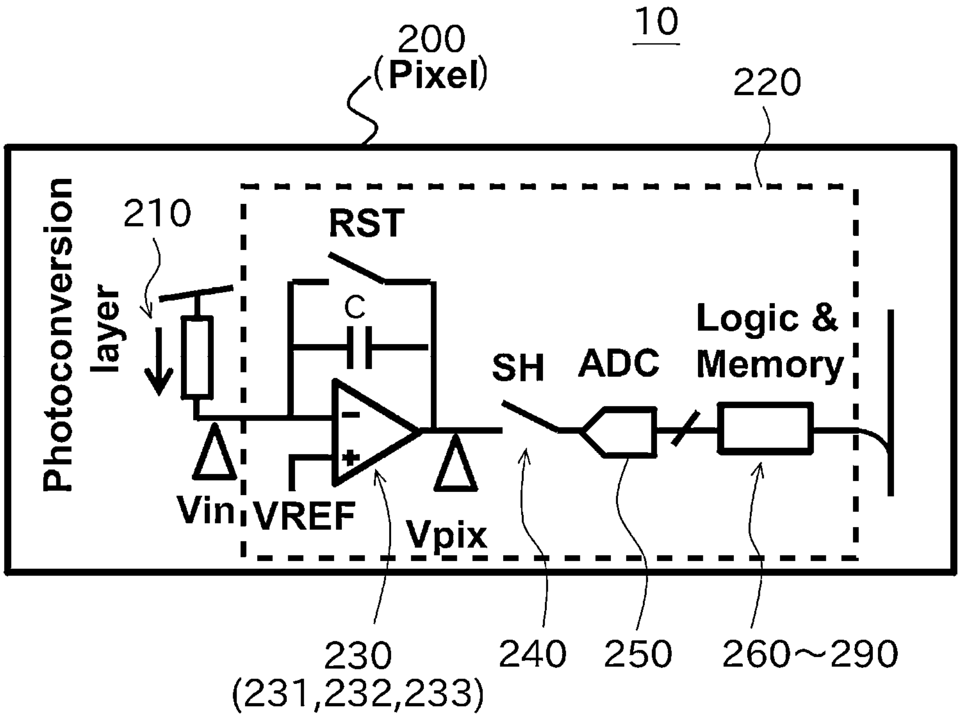
FIG. 3 is a circuit diagram showing an example configuration of the pixel of the solid-state imaging device relating to the first embodiment of the present disclosure.
Figure 4:
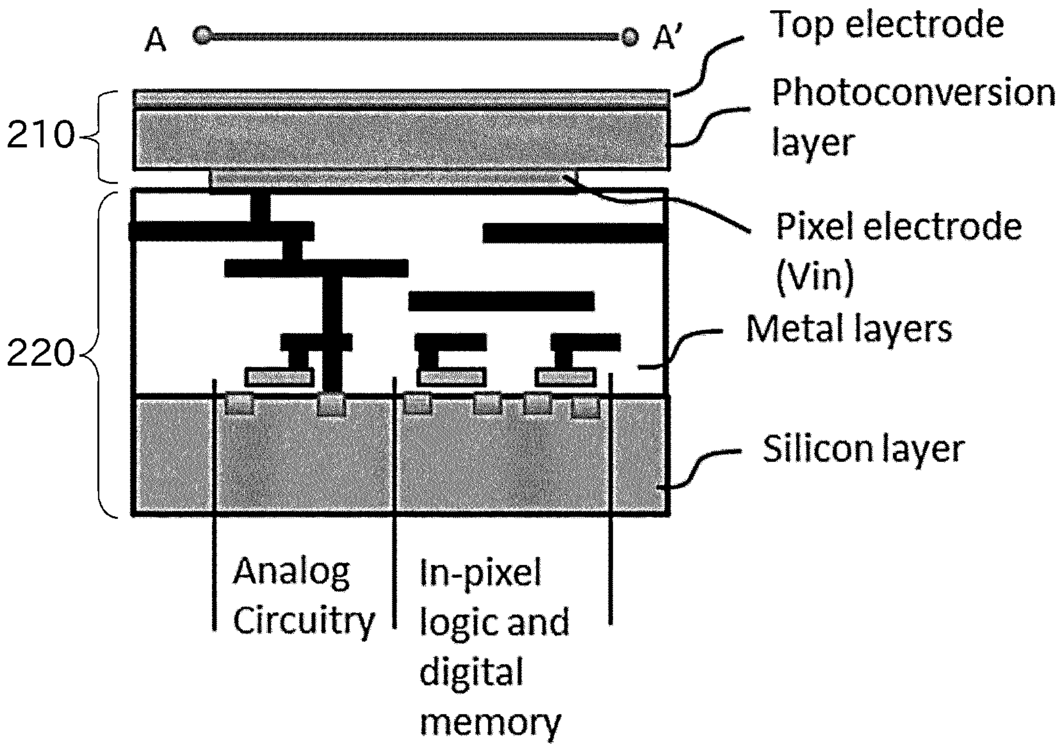
FIG. 4 is a simplified sectional view to illustrate a stacked structure of the pixel of the solid-state imaging device relating to the first embodiment.
Figure 5:
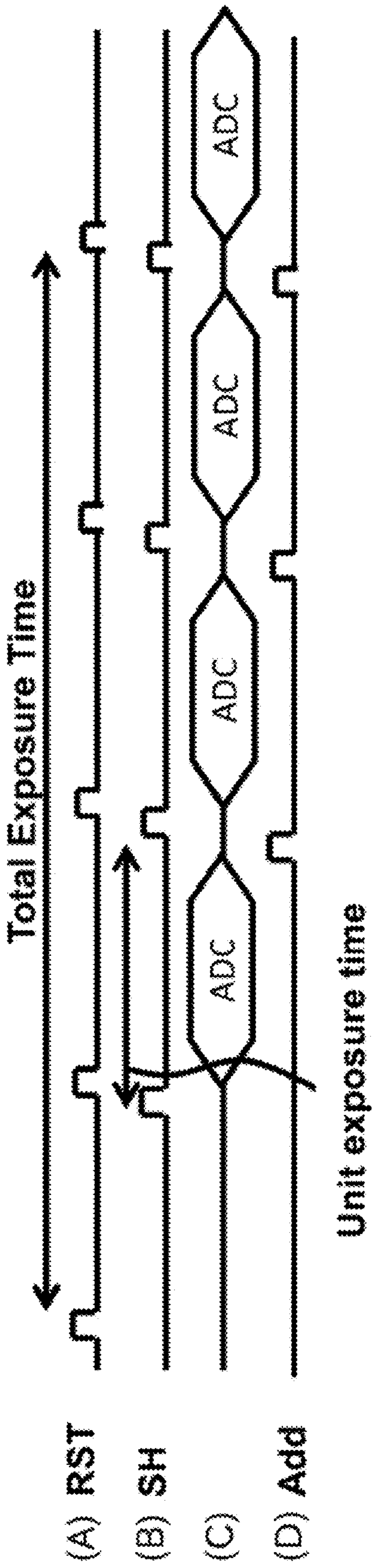
FIG. 5 is a timing chart to illustrate an example sequence of operations for reading performed on the pixel in the solid-state imaging device relating to the first embodiment of the present disclosure.

FIG. 1 is a block diagram showing an example configuration of a solid-state imaging device relating to a first embodiment of the present disclosure. FIG. 2 shows an example configuration of a pixel of the solid-state imaging device relating to the first embodiment of the present disclosure. FIG. 3 is a circuit diagram showing an example configuration of a pixel of the solid-state imaging device relating to the first embodiment of the present disclosure. FIG. 4 is a simplified sectional view to illustrate a stacked structure of the solid-state imaging device relating to the first embodiment. FIG. 5 is a timing chart including parts (A) to (D) to illustrate an example sequence of operations for reading performed on the readable pixel in the solid-state imaging device relating to the first embodiment of the present disclosure.

In the first embodiment, a solid-state imaging device 10 includes a sensor, for example, a SWIR sensor, which includes a pixel array formed in a pixel part 20 and a data reading circuit (pixel circuit), as shown in FIG. 2.

As shown in FIG. 1, the solid-state imaging device 10 is constituted mainly by a pixel part 20 serving as an image capturing part, a vertical scanning circuit (a row scanning circuit) 30, a reading circuit 40 including a pixel signal processing part a horizontal scanning circuit (a column scanning circuit) 50, and a timing control circuit 60. Among these components, for example, the vertical scanning circuit 30, the reading circuit 40, the horizontal scanning circuit 50, and the timing control circuit 60 constitute a reading part 70 for reading out pixel signals.

In the first embodiment, the data saturation level is increased using DPS by oversampling and accumulating pixel level data, and the CTIA circuit is used instead of a source follower to keep the bias of the QD layer constant and the dark current stable.

Digital frame oversampling with DPS (Digital pixel sensor) using CTIA yields the following distinctive configurations and features.

<Digital Frame Oversampling and Digital Accumulation>

- The DPS approach enables data accumulation in the digital domain.
- Sub-frame oversampling by a high-speed ADC and digital adder improves the dynamic range of offset cancellation.

<Fixing QD Bias Condition by CTIA Readout Circuit>

The QD bias is almost fixed to the reference voltage VREF by feedback. Error becomes approximately VSIG/Av (VSIG is output signal voltage. Av is amplifier gain.) QD bias voltage fluctuation is suppressed to 1/Av. Then voltage fluctuation can be ignored by increasing amplifier gain.

<Basic Architecture>

In the first embodiment, pixels 200 are arranged in a matrix pattern in the pixel part 20, and each pixel 200 is basically configured as shown in FIG. 2. Cross section of a unit pixel 200 in line of A-A' is shown in FIG. 4. As shown in FIG. 4, the pixel 200 is composed of a photoelectric conversion film (layer, material) 210 and a semiconductor pixel circuit 220. The photoelectric conversion material has the NIR (infrared)/SWIR (short wavelength infrared) sensitivity.

The pixel 200, as shown in FIG. 3, includes a pixel analog (amplifier) circuit 230 that detects the photoelectric conversion current, a sample and hold circuit 240, an ADC 250, in-pixel logic 260, and digital memory 270. The analog (amplifier) circuit 230 also functions as a current integrator and voltage stabilizer for the photoelectric conversion layer 210 through feedback operation.

More specifically, the pixel 200 includes the photoelectric conversion film 210 that converts light into a photogenerated current and the semiconductor pixel circuit 220. The photoelectric conversion film 210 and the semiconductor pixel circuit 220 are stacked together and electrically coupled within the pixel 200, and for example, the photoelectric conversion film 210 is sensitive to infrared NIR.

The semiconductor pixel circuit 220 includes the pixel analog circuit 230 that detects the photogenerated current and a pixel analog-to-digital (AD) conversion circuit (ADC) 250 that converts an analog signal from the pixel analog circuit 230 into a digital signal.

The pixel 200 includes the pixel digital memory 270 that records digital signals from the pixel AD conversion circuit 250, and a pixel digital reading circuit 280 that reads digital signals from the digital memory 270.

The pixel analog circuit 230 includes an in-pixel feedback circuit 231 that keeps the voltage applied to the photoelectric conversion film constant, and an in-pixel integrator circuit 232 that integrates the photogenerated current and converts it to a voltage, and an initialization circuit 233 to initialize the in-pixel integrator circuit 232.

Between the pixel analog circuit 230 and the pixel AD conversion circuit 250, there is a pixel sample-and-hold circuit 240. The integrator circuit 232 in the pixel can be initialized immediately after the integrated voltage signal is sampled and held in the pixel sample-and-hold circuit 240 shown as 'unit exposure time' in FIG. 5.

A reading part 70 that controls readout operation of pixel signals from the pixels 200 is also provided. Under the control of the reading part 70, the digital conversion of the signal of the pixel sample-and-hold circuit 240 is started, and the in-pixel integrator circuit 232 is initialized for signal integration of sub-frame cycle. The sample and hold, initialization, and AD conversion can be repeated at every fixed or specific pattern of integration time.

In addition, a pixel digital adder circuit 290 that adds sub-frame digital signals in obtained by repeated AD conversion and rewrites a memory signal is provided in each pixel unit.

As described later, it is also possible to configure the pixel AD conversion circuit 250 to be shared by multiple pixels.

It is also possible to provide a digital adder circuit 290 that adjusts the ramp waveform inputted to the pixel AD conversion circuit 250 for each shared pixel and changes the digital conversion gain.

<Pixel-Level Oversampling>

The in-pixel logic circuit 260 is capable to implement a digital adder circuit (adder) 290. During the entire exposure time (Total exposure time), an analog integral signal (Vpix) is converted to digital in faster cycles (Unit exposure time) and all the digital data is integrated by the digital adder circuit (adder) 290. The effective LFW (Linear Full Well) corresponding to the integration signal charge capacity is increased by the number of sub-frame integrations/additions performed by the ADC 250 during the total exposure time.

During the total exposure time, a bias voltage (Vin) of the photoelectric conversion layer is kept at VREF through feedback from the amplifier 230, ensuring the stability of the photoelectric conversion characteristics. Digital addition (pixel-level oversampling as described above) allows data to be stored in the digital domain without degrading analog gain. In addition, it prevents time-dependent data degradation during the integration time compared to analog summation in voltage domain by analog memories (capacitors). Because analog memory has leakage current.

The description continues with reference again to FIG. 1.

The vertical scanning circuit 30 drives the pixels in shutter and read-out rows through the row-scanning control lines under control of the timing control circuit 60. Further, the vertical scanning circuit 30 outputs, according to address signals, row selection signals for row addresses of the reading rows from which signals are read out and the shutter rows in which the charges stored in the photoelectric conversion film 210 are reset.

The horizontal scanning circuit 50 scans the signals processed in the plurality of pixel signal processing parts of the reading circuit 40, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like.

As described above, in the first embodiment, the data saturation level is increased using the DPS with oversampling and digital accumulation in pixel level ADC data, and the CTIA circuit is used instead of a source follower to keep the bias voltage of the QD layer constant and the dark current stable. Further, the following configuration is included. More specifically, the pixel 200 includes the photoelectric conversion film (layer, material) 210 and the semiconductor pixel circuit 220. The photoelectric conversion material is sensitive to NIR (infrared)/SWIR (short wavelength infrared). The pixel 200 includes a pixel analog (amplifier) circuit 230 that detects the photoelectric conversion current, a sample-and-hold circuit 240, an ADC 250, in-pixel logic 260, and digital memory 270. The analog (amplifier) circuit 230 also functions as a current integrator and voltage stabilizer for the photoelectric conversion layer 210 through feedback operation.

The semiconductor pixel circuit 220 includes the pixel analog circuit 230 that detects the photogenerated current, the sample-and-hold circuit 240, and the pixel analog-to-digital (AD) conversion circuit (ADC) 250 that converts an analog signal from the pixel analog circuit 230 into a digital signal. The pixel 200 includes the pixel digital memory 270 that records digital signals from the pixel AD conversion circuit 250, and a pixel digital reading circuit 280 that reads digital signals from the digital memory 270. The pixel analog circuit 230 includes an in-pixel feedback circuit 231 that keeps the voltage applied to the photoelectric conversion film constant, and an in-pixel integrator circuit 232 that integrates the photogenerated current and converts it to a voltage, and an initialization circuit 233 to initialize the in-pixel integrator circuit 232. Between the pixel analog circuit 230 and the pixel AD conversion circuit 250, there is a pixel sample-and-hold circuit 240. The integrator circuit 232 in the pixel can be initialized immediately to start next sub-frame integration after the integrated voltage signal is sampled and held in the pixel sample-and-hold circuit 240.

According to the aspect of the first embodiment, it is possible to obtain high pixel integration capacity without gain degradation and stable photosensitivity during signal integration. It also achieves less interface bandwidth and no need for cooling.

Second Embodiment

Figure 6:
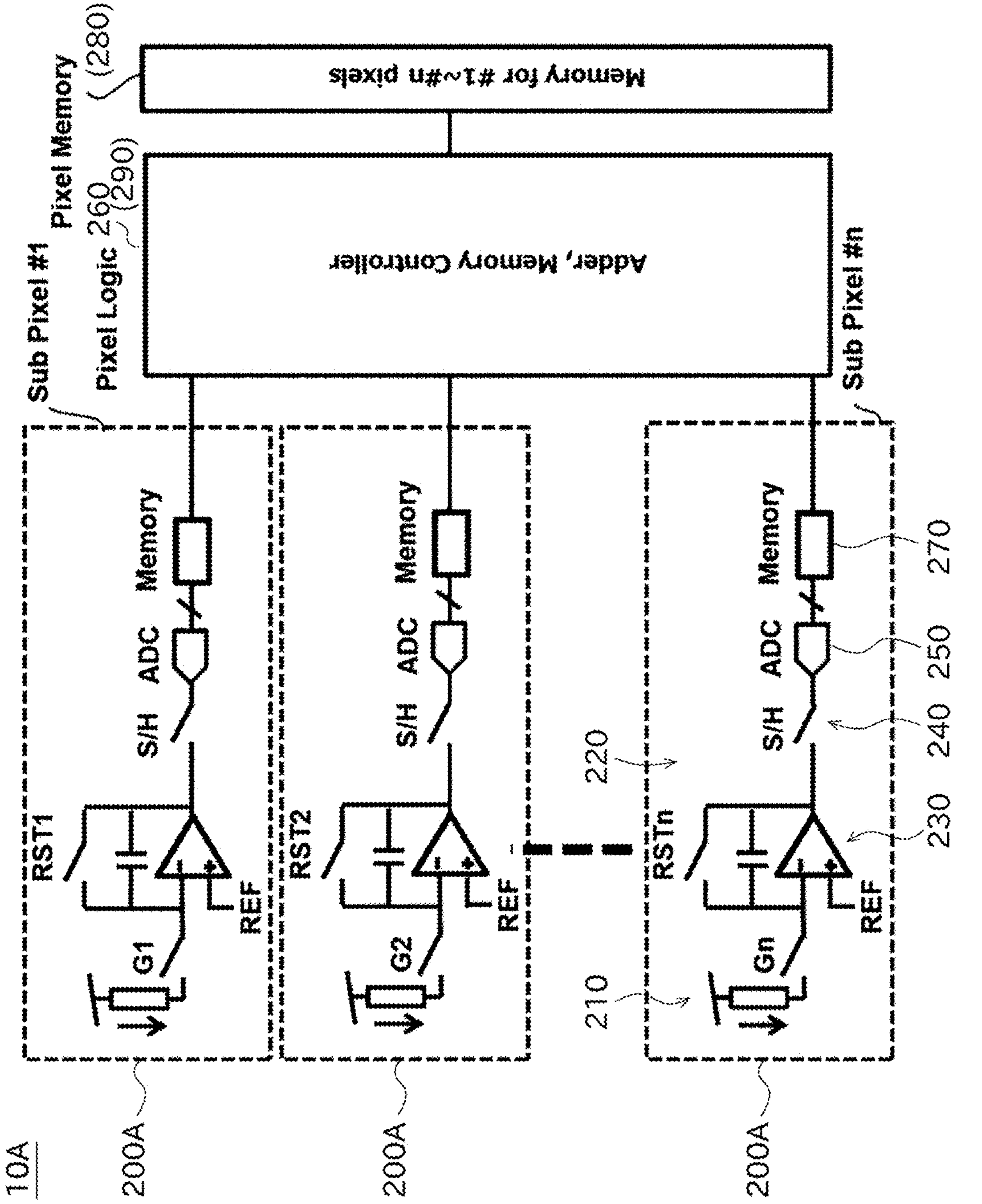
FIG. 6 is a circuit diagram showing an example configuration of the pixel of the solid-state imaging device relating to the second embodiment of the present disclosure.

FIG. 6 is a circuit diagram showing an example configuration of a pixel of the solid-state imaging device relating to the second embodiment of the present disclosure.

A solid-state imaging device 10A relating to the second embodiment differs from the solid-state imaging device 10 relating to the above-described first embodiment in the following points.

More specifically, for the pixels 200A of the solid-state imaging device 10A relating to the second embodiment, the in-pixel logic circuit 260 is shared by multiple pixels (sub-pixels) 200A.

<In-Pixel Logic Circuit Shared by Multiple Pixels>

In a SWIR sensor system, to form the digital adder 290 and memory controller implemented in in-pixel logic 260, a large number of transistors are required. Therefore, in the second embodiment, the in-pixel logic circuit 260 is shared by multiple sub-pixels. This configuration of the second embodiment allows the total number of the logic transistors per sub-pixel to be reduced.

The second embodiment makes it possible not only to produce the same effects as the above-described first embodiment but also to further suppress the increase of power consumption and circuit areas.

Third Embodiment

Figure 7:
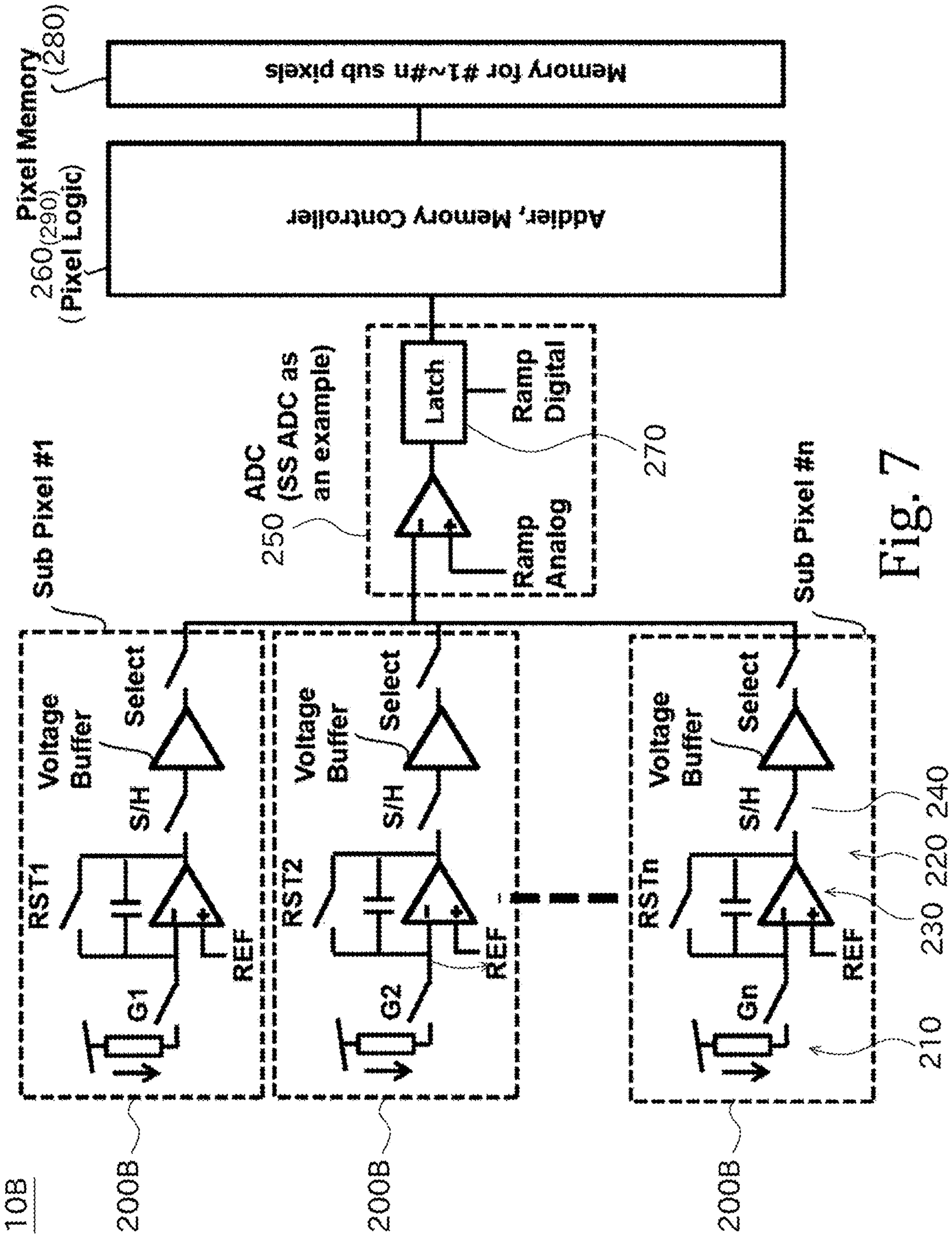
FIG. 7 is a circuit diagram showing an example configuration of the pixel of the solid-state imaging device relating to the third embodiment of the present disclosure.

FIG. 7 is a circuit diagram showing an example configuration of a pixel of the solid-state imaging device relating to the third embodiment of the present disclosure.

A solid-state imaging device 10B relating to the third embodiment differs from the solid-state imaging device 10A relating to the above-described second embodiment in the following points.

More specifically, for pixels 200B of the solid-state imaging device 10B relating to the third embodiment, the ADC 250 and the in-pixel logic circuit 260 are shared by multiple pixels (sub-pixels) 200B.

<In-Pixel Logic Circuit Shared by Multiple Pixels and ADC>

In the SWIR sensor system, the ADC 250 and in-pixel logic circuit 260 are shared by the multiple sub-pixels. Latch circuit is applied as the memory in this embodiment. Pixel signals are sampled and held within respective sub-pixels and then sequentially converted to digital by the shared ADC via corresponding select switches (Select). A voltage buffer VBF is placed between the sample and hold (S/H) switch 240 and the select switch SSW to reduce the influence of the select switch SSW and the kickback effect of the ADC 250. This reduces the number of analog devices per sub-pixel as well as logic transistors in the third embodiment.

The third embodiment makes it possible not only to produce the same effects as the above-described first and second embodiments but also to further suppress the increase of power consumption and circuit areas.

Fourth Embodiment

Figure 8:
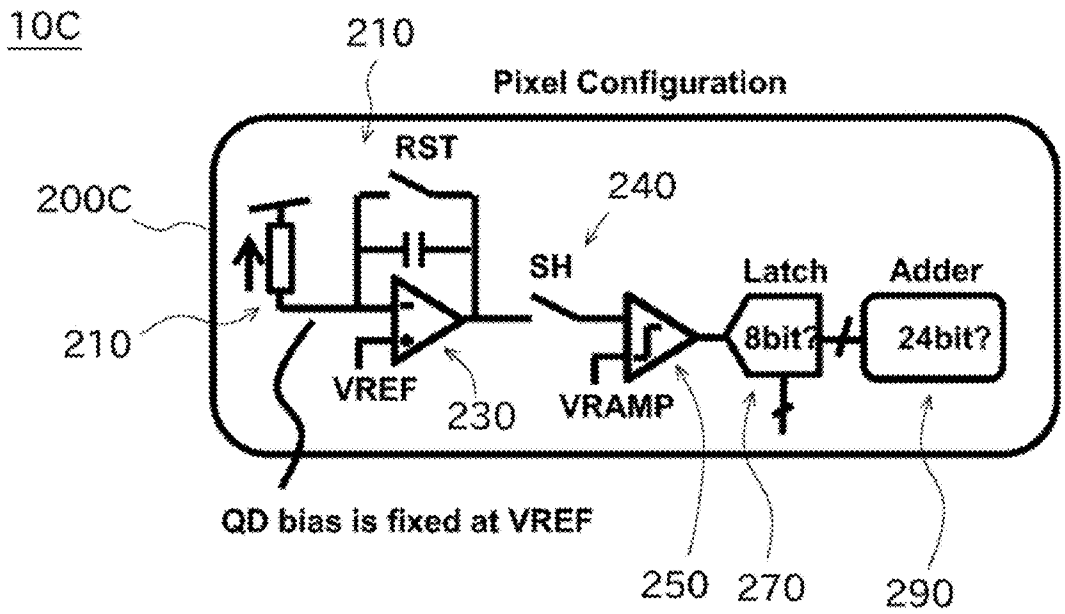
FIG. 8 is a circuit diagram showing an example configuration of the pixel of the solid-state imaging device relating to the fourth embodiment of the present disclosure.
Figure 9:
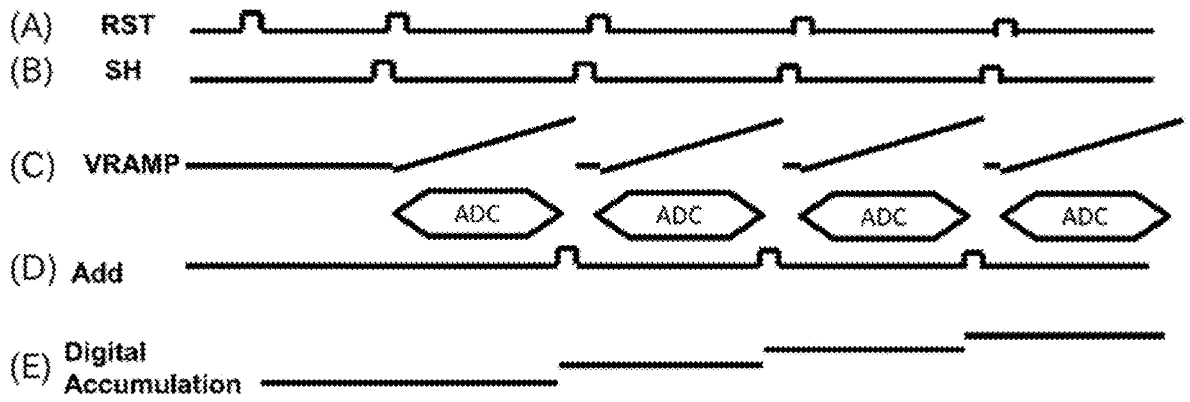
FIG. 9 is a timing chart to illustrate an example sequence of operations for reading performed on the readable pixel in the solid-state imaging device relating to the fourth embodiment of the present disclosure.

FIG. 8 is a circuit diagram showing an example configuration of a pixel of the solid-state imaging device relating to the fourth embodiment of the disclosure. FIG. 9 is a timing chart to illustrate an example sequence of operations for reading performed on the readable pixel in the solid-state imaging device relating to the fourth embodiment of the disclosure. FIG. 8 shows the circuit diagram when a single slope (SS) ADC with latch circuit as the pixel digital memory is used, and FIG. 9 shows frame oversampling operation.

In this fourth embodiment, adoption of the SS ADC has the advantage of simplifying the pixel configuration. Note that the VRAMP and digital count codes are common, and can be applied adaptively to AD conversion gain control and variable conversion speed.

Fifth Embodiment

Figure 10:
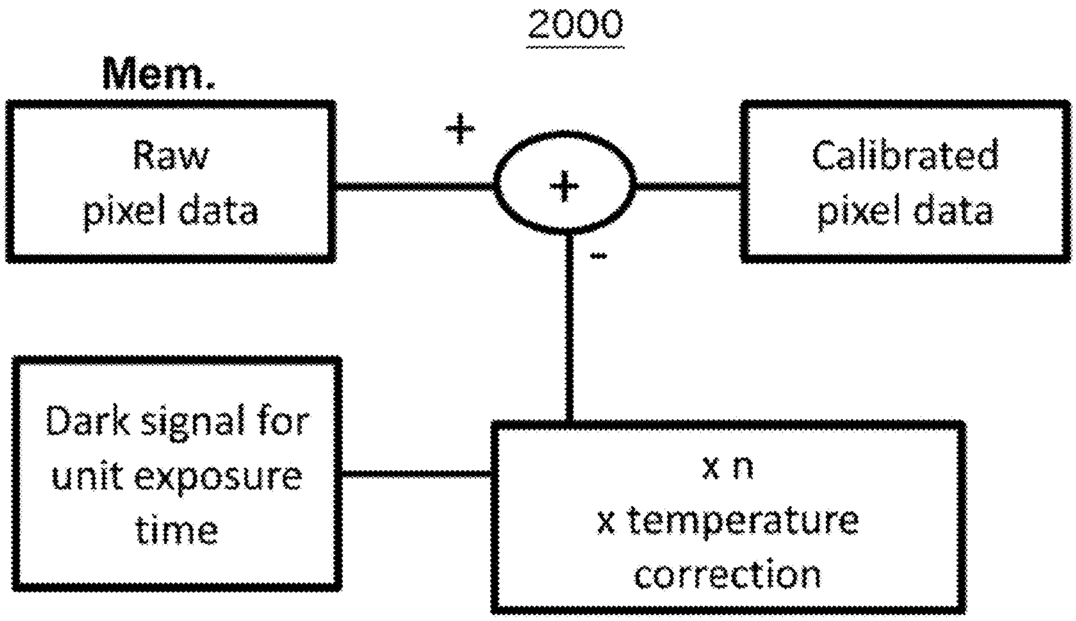
FIG. 10 is a circuit diagram showing an example configuration of a calibration system for the pixel of the solid-state imaging device relating to the fifth embodiment of the present disclosure.
Figure 11:
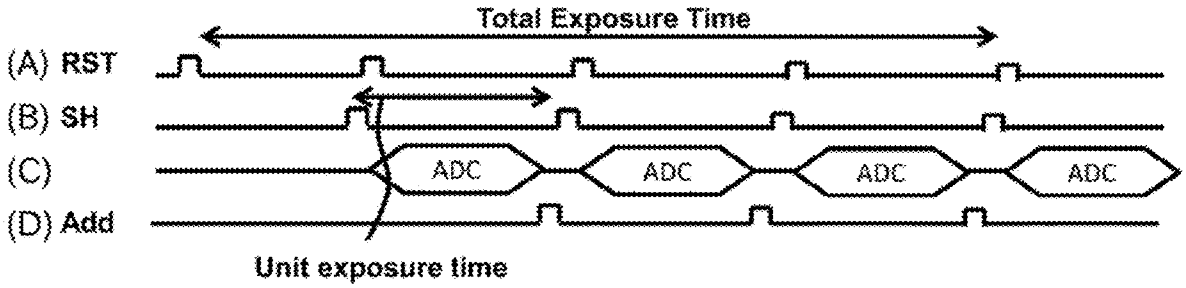
FIG. 11 is a timing chart to illustrate an example sequence of operations for reading performed on the readable pixel in the solid-state imaging device relating to the fifth embodiment of the present disclosure.

FIG. 10 is a circuit diagram showing an example configuration of a calibration system for the pixel of the solid-state imaging device relating to the fifth embodiment of the present disclosure. FIG. 11 is a timing chart to illustrate an example sequence of operations for reading performed on the readable pixel in the solid-state imaging device relating to the fifth embodiment of the disclosure.

This fifth embodiment relates to a solid-state imaging device 10D in which dark signal subtraction using dark signal data is used.

In case of the n times of ADC/data additions in total exposure, considering the fixed bias conditions at the photoconversion layer, the dark current can be expressed as n times of dark current (Drak) of the unit exposure time. The dark signal in each individual pixel for the unit exposure time is measured in advance and stored in the calibration system 2000. Offset calibration is performed by the following equation using signal data Sig (raw) of n times of ADC/data additions.

[Mathematical Expression 1]

$$Sig = Sig(\text{raw}) - n \times \text{Dark(Unit exposure time)}$$

Note that the offset calculation can also take temperature dependence into account by multiplying the coefficient corresponding to the temperature. Using this scheme, the offset calibration can be made flexible and can easily accommodate different exposure times. This calibration process can be performed in the pixel domain, on-chip domain, and externally.

The solid-state imaging devices 10 and 10A to 10D described above can be applied, as an imaging device, to electronic apparatuses such as digital cameras, video cameras, mobile terminals, surveillance cameras, and medical endoscope cameras.

Figure 12:
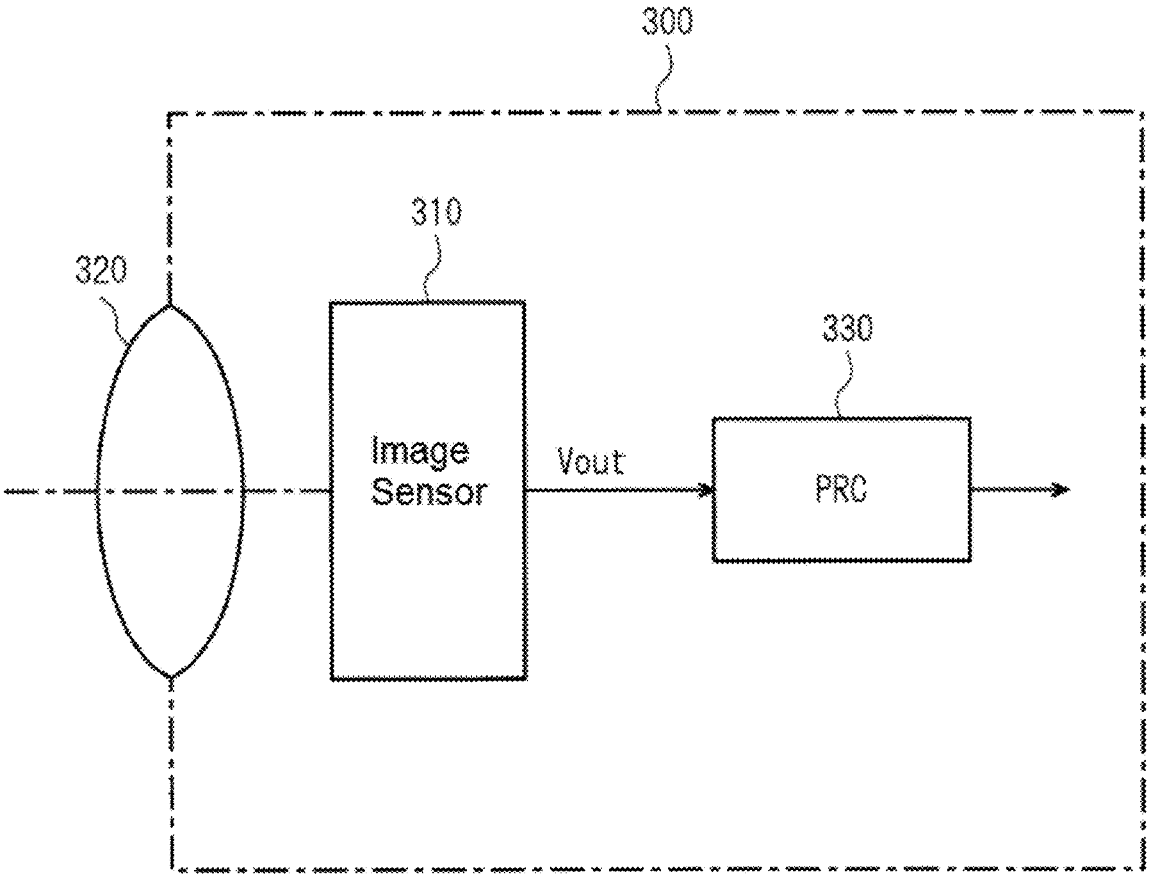
FIG. 12 shows an example configuration of an electronic apparatus to which the solid-state imaging devices relating to the embodiments of the present disclosure can be applied.

FIG. 12 shows an example configuration of an electronic apparatus including a camera system to which the solid-state imaging devices according to the embodiments of the present disclosure can be applied.

As shown in FIG. 12, the electronic apparatus 300 includes a SWIR image sensor 310 that can be constituted by any of the solid-state imaging devices 10, 10A, 10B, 10C, and 10D relating to the embodiments of the present disclosure. The electronic apparatus 300 further includes an optical system (such as a lens) 320 for redirecting the incident light to the pixel region of the SWIR image sensor 310 (to form a subject image). The electronic apparatus 300 includes a signal processing circuit (PRC) 330 for processing the output signals from the SWIR image sensor 310.

The signal processing circuit 330 performs predetermined signal processing on the output signals from the SWIR image sensor 310. The image signals resulting from the processing in the signal processing circuit 330 can be handled in various manners. For example, the image signals can be displayed as a video image on a monitor having a liquid crystal display, printed by a printer, or recorded directly on a storage medium such as a memory card.

As described above, a high-performance, compact, and low-cost camera system can be provided that includes the above-described solid-state imaging device 10, 10A, 10B, 10C or 10D as the SWIR image sensor 310. Accordingly, the embodiments of the present disclosure can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising a pixel part including pixels arranged therein, wherein the pixels each include a photoelectric conversion film converting light into a photogenerated current and a semiconductor pixel circuit, wherein the photoelectric conversion film has an infrared sensitivity, wherein, within each pixel, the photoelectric conversion film is stacked on the semiconductor pixel circuit and is electrically coupled to the semiconductor pixel circuit, wherein the semiconductor pixel circuit includes:

a pixel analog circuit detecting the photogenerated current generated in the photoelectric conversion film, and a pixel analog-to-digital (AD) conversion circuit converting an analog signal from the pixel analog circuit to a digital signal.

2. The solid-state imaging device of claim 1, wherein the pixels each include:

a pixel digital memory recording the digital signal from the pixel AD conversion circuit; and memory.

3. The solid-state imaging device of claim 2, wherein the pixel analog circuit includes:

an in-pixel feedback circuit keeping a voltage applied to the photoelectric conversion film at a constant level; and an in-pixel integrator circuit integrating and converting the photogenerated current into a voltage, and a pixel initialization circuit initializing the integrator circuit.

4. A solid-state imaging device comprising a pixel part including pixels arranged therein, wherein the pixels each include a photoelectric conversion film converting light into a photogenerated current and a semiconductor pixel circuit, wherein the photoelectric conversion film and the semiconductor pixel circuit are stacked and electrically coupled to each other within the pixel, wherein the photoelectric conversion film has an infrared sensitivity, wherein the semiconductor pixel circuit includes a pixel analog circuit detecting the photogenerated current, and a pixel analog-to-digital (AD) conversion circuit converting an analog signal from the pixel analog circuit to a digital signal, wherein the pixels each include:

a pixel digital memory recording the digital signal from the pixel AD conversion circuit; and a pixel digital reading circuit reading out the digital signal from the pixel digital memory, wherein the pixel analog circuit includes:

an in-pixel feedback circuit keeping a voltage applied to the photoelectric conversion film at a constant level; and an in-pixel integrator circuit integrating and converting the photogenerated current into a voltage, and a pixel initialization circuit initializing the integrator circuit wherein the pixels each include a pixel sample-and-hold circuit between the pixel analog circuit and the pixel AD conversion circuit, and wherein the in-pixel integrator circuit can be initialized immediately after the integrated voltage signal is sampled and held in the pixel sample-and-hold circuit.

5. The solid-state imaging device of claim 4, further comprising a reading part controlling reading of a pixel signal from the pixel, wherein, under control of the reading part, digital conversion of a signal of the pixel sample-and-hold circuit is started and the in-pixel integrator circuit is initialized, and the sample and hold, initialization, and AD conversion can be repeated at every fixed or specific pattern of integration time.

6. The solid-state imaging device of claim 5, further comprising a pixel digital adder circuit adding digital signals obtained by repeated AD conversion and rewriting a memory signal.

7. The solid-state imaging device of claim 1, wherein the pixel AD conversion circuit is shared by the multiple pixels.

8. The solid-state imaging device of claim 7, wherein a ramp waveform inputted to the pixel AD conversion circuit is adjusted for each shared pixel and changes a digital conversion gain.

9. A method for manufacturing a solid-state imaging device having a pixel part that includes pixels arranged therein, the method comprising:

forming the pixels by a photoelectric conversion film and semiconductor pixel circuits; and wherein the photoelectric conversion film has an infrared sensitivity, stacking the photoelectric conversion film on the semiconductor pixel circuits and electrically coupling the photoelectric conversion film and the semiconductor pixel circuits in the respective pixels, the method further comprising forming, in the semiconductor pixel circuit, a pixel analog circuit that detects the photogenerated current generated in the photoelectric conversion film, and a pixel analog-to-digital (AD) conversion circuit that converts an analog signal from the pixel analog circuit to a digital signal.

10. An electronic apparatus comprising:

a solid-state imaging device; and an optical system for forming a subject image on the solid-state imaging device, wherein the solid-state imaging device includes a pixel part having a pixel arranged therein, wherein the pixels each include a photoelectric conversion layer converting light into a photogenerated current and a semiconductor pixel circuit, wherein the photoelectric conversion film has an infrared sensitivity, wherein, within each pixel, the photoelectric conversion film is stacked on the semiconductor pixel circuit and is electrically coupled to the semiconductor pixel circuit, wherein the semiconductor pixel circuit includes a pixel analog circuit detecting the photogenerated current generated in the photoelectric conversion film, and a pixel analog-to-digital (AD) conversion circuit converting an analog signal from the pixel analog circuit to a digital signal.

* * * * *